3,407,222
PREPARATION OF 2-HYDROXYALKYLDITHIO
CARBAMATES FROM EPOXIDES AND AMINE
SALTS OF DITHIO-CARBAMIC ACID
Thomas Andrew Lies, Montgomery, N.J., assignor to
American Cyanamid Company, Stamford, Conn., a corporation of Maine
No Drawing. Filed Aug. 24, 1965, Ser. No. 482,291
9 Claims. (Cl. 260—455)

ABSTRACT OF THE DISCLOSURE

Process for the preparation of 2-hydroxyalkyl dithiocarbamate which comprises the steps of: reacting in an inert alcoholic medium at a temperature between about 30° C. and about 75° C. in substantially equimolar proportions a dithiocarbamate salt of the formula:

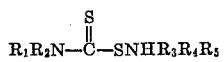

with an epoxide of the formula:

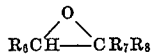

in which $R_1$, $R_2$, $R_5$, $R_6$, $R_7$ and $R_8$ are each hydrogen, alkyl, phenyl, naphthyl, cyclohexyl or phenylethyl; $R_3$ and $R_4$ are each hydrogen, alkyl; cyclohexyl or phenylethyl, and wherein $R_1$ and $R_2$ as well as $R_3$ and $R_4$ taken together with the nitrogen atom in the above said dithiocarbamate salt form an heterocyclic N-moiety selected from the group consisting of pyrrolidino, piperidino and morpholino.

---

The present invention relates to novel processes for the preparation of 2-hydroxyalkyl dithiocarbamate esters and has for its principal object the provision of such processes. More particularly, the invention relates to a process for the preparation of diverse 2-hydroxyalkyl dithiocarbamates and mixtures of isomeric 2-hydroxyalkyl dithiocarbamates as graphically represented by the equation:

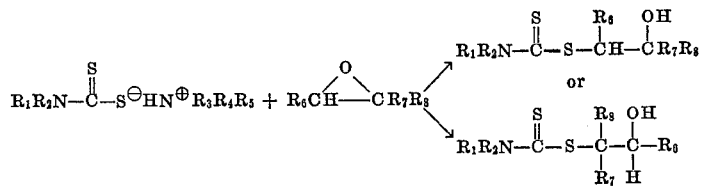

wherein $R_1$, $R_2$, $R_5$, $R_6$, $R_7$ and $R_8$ are each hydrogen, alkyl, aryl, cycloalkyl, alkenyl, cycloalkenyl or aralkyl; $R_3$ and $R_4$ are each hydrogen, alkyl, cycloalkyl, alkenyl, cycloalkenyl or aralkyl; and wherein $R_1$ and $R_2$ as well as $R_3$ and $R_4$ when taken together with the nitrogen atom form a heterocyclic N-moiety, for instance, morpholino, pyrrolidino or piperidino.

As is known, the dithiocarbamate esters as hereinabove defined could be obtained in the prior practice by reaction of a dithiocarbamate salt with a haloalcohol. However, the process is not wholly satisfactory. Chloroalcohols, for instance, react sluggishly with dithiocarbamate salts, the bromoalcohols are somewhat less sluggish but are highly uneconomical. Thus, to provide a process which could overcome the disadvantages and difficulties of the prior practice would be highly desirable.

In accordance with the process of the invention, it is found that the addition of substantially equimolar proportions of an epoxide to a dithiocarbamate salt in an inert appropriate solvent therefor occurs in a straightforward fashion. Where ethylene oxide or a substituted epoxide is employed in the hereinabove graphically defined reaction, the reaction proceeds smoothly at temperatures in the range from about 30° C. to about 75° C. Resulting products of the reaction can be isolated by concentrating the mixture, extracting the products from the residue with a suitable organic solvent, washing the organic extract solution with water and, thereafter, evaporating solvent.

Recovered products are useful as herbicides, nematocides or as intermediates in the preparation of insecticides, such as the highly active iminophosphate pesticides. Further, they can be readily cyclized, such as by treatment with hydrogen halide in absolute ethanol or concentrated hydrochloric acid at temperatures of from about 20° C. to about 80° C. and thereafter are readily converted from resultant cyclized 2-imino-1,3-dithiolane to the extremely active phosphorus pesticide by treatment with an O,O-dialkyl phosphorohalothioate.

Illustrative dithiocarbamate salt reactant includes amongst others:
ammonium dithiocarbamate,
ammonium pyrrolidinecarbodithioate,
ammonium piperidinecarbodithioate,
ammonium morpholinecarbodithioate,
cyclohexylammonium cyclohexyldithiocarbamate,
pyrrolidinium 1-pyrrolidinecarbodithioate,
isopropylammonium isopropyldithiocarbamate,
hexadecylammonium hexadecyldithiocarbamate,
ammonium dithiocarbanilate,
ammonium 2-phenylethyldithiocarbamate, and
dimethylammonium dimethyldithiocarbamate.

Diverse exemplary epoxide reactants include:
ethylene oxide,
propylene oxide,
isobutylene oxide,
1-dodecene oxide,
trans-2,3-butylene oxide,
cyclohexene oxide, and
styrene oxide.

The following examples are provided to further facilitate understanding of the invention. These are merely illustrative and are not intended to be taken as limitative.

EXAMPLE 1

Preparation of 2-hydroxyethyl dithiocarbamate

Into a suitable three-neck flask fitted with an ice condenser, stirrer, thermometer, and gas inlet tube is added a solution of ammonium dithiocarbamate (33.0 grams, 0.30 mole) in absolute methanol (250 ml.). The mixture is stirred and heated to 37° C. Ethylene oxide (17.0 grams, 0.39 mole) is next bubbled into the solution over a 15-minute period at a temperature of 37° C. to 45° C. The reaction mixture is stirred for one hour at 25° C. and then concentrated in vacuo. The oily residue is mixed with ether (400 ml.) and water (25 ml.) and the organic layer, recovered and dried, is concentrated in vacuo to yield 32.0 grams of 2-hydroxyethyl dithiocarbamate representing a 75% theoretical yield.

Further, repeated water-washing of an ether solution of the crude 2-hydroxy dithiocarbamate yields pure 2-hydroxyethyl dithiocarbamate, a viscous yellow oil which on thin layer chromatography examination is shown to be a single compound. Upon elemental analysis, the following is recorded in percent.

Calcd. for $C_3H_7NOS_2$: C, 26.27; H, 5.14; N, 10.21; S, 46.75. Found: C, 26.27; H, 5.13; N, 10.01; S, 46.75.

Example 1 is repeated in every detail except that the dithiocarbamate salt is substituted by diverse salts as follows:

(A) Ammonium 1-pyrrolidinecarbodithioate in methanol is treated with a 30% molar excess of ethylene oxide to yield 2-hydroxyethyl 1-pyrrolidinecarbodithioate in good yield.

(B) Ammonium 1-piperidinecarbodithioate (prepared from equimolar proportions of piperidine, carbon disulfide and ammonia in aqueous alcohol) in methanol solution is treated with a 30% molar excess of ethylene oxide to yield 2-hydroxyethyl 1-piperidinecarbodithioate in good yield.

(C) Ammonium 1-morpholinecarbodithioate (prepared from equimolar proportions of morpholine, carbon disulfide and ammonia in aqueous alcohol) in methanol solution is treated with a 30% molar excess of ethylene oxide to yield 2-hydroxyethyl 1-morpholinecarbodithioate.

(D) A 30% molar excess of ethylene oxide added to a solution of cyclohexylammonium cyclohexyldithiocarbamate in methanol at 35° C. to 45° C. yields 2-hydroxyethyl cyclohexyldithiocarbamate in good yield.

(E) Piperidinium 1-piperidinecarbodithioate is treated with ethylene oxide to yield 2-hydroxyethyl 1-piperidinecarbodithioate.

(F) Piperidinium dithiocarbamate is treated with ethylene oxide to yield 2-hydroxyethyl dithiocarbamate.

(G) Pyrrolidinium 1 - pyrrolidinecarbodithioate is treated with ethylene oxide to yield 2-hydroxyethyl 1-pyrrolidinecarbodithioate.

(H) Pyrrolidinium dithiocarbamate (obtained from ammonium dithiocarbamate and pyrrolidine hydrochloride in cold concentrated aqueous solution) is treated with ethylene oxide to yield 2-hydroxyethyl dithiocarbamate.

(I) 1-naphthyl dithiocarbamate is treated with ethylene oxide to yield 2-hydroxyethyl 1-naphthyldithiocarbamate.

EXAMPLE 2

Preparation of 2-hydroxypropyl dithiocarbamate

A solution of ammonium dithiocarbamate (33.0 grams, 0.30 mole) in absolute methanol (200 ml.) is heated to 40° C. in a suitable three-neck flask equipped with a condenser cooled with ice-water, dropping funnel, thermometer, and magnetic stirrer, and propylene oxide (23.2 grams, 0.40 mole) is added dropwise with stirring over a 1.5 hour period while a temperature of 40° C. to 45° C. is maintained. After addition, the reaction mixture is stirred at 25° C. for 1.25 hours and then concentrated in vacuo to leave a residue which is taken up in ether. The ether solution is washed with seven small portions of water, dried over anhydrous magnesium sulfate, and concentrated in vacuo to yield 34.5 grams of crude product. Recrystallization from methylene chloride results in a 57% yield of 2-hydroxypropyl dithiocarbamate whose melting point is 58° C. to 62° C. Its elemental analysis (in percent) is as follows:

Calcd. for $C_4H_9NOS_2$: C, 31.75; H, 6.00; N, 9.26; S, 42.39. Found: C, 32.02; H, 5.90; N, 9.07; S, 42.29.

Repeating Example 2 in every detail except that ammonium dithiocarbamate is reacted with a 30% molar excess of isobutylene oxide to yield 2-hydroxy-2-methylpropyl dithiocarbamate; reaction of ammonium dithiocarbamate with styrene oxide under the same conditions results in a good yield of 2-hydroxyphenethyl dithiocarbamate.

EXAMPLE 3

Preparation of 2-hydroxydodecyl dithiocarbamate

A solution of ammonium dithiocarbamate (30.5 grams, 0.277 mole) in 250 ml. of methanol is prepared in a suitable three-neck flask equipped with thermometer, reflux condenser, stirrer, and dropping funnel. 1-dodecene oxide (51.1 grams, 0.277 mole) is added dropwise while maintaining a reaction temperature of 26° C. to 44° C. by cooling with an ice bath. When addition is complete, stirring at 25° C. is continued for 3 hours. The yellow solution is then concentrated in vacuo to leave the crude solid product, which is recrystallized from benzene-hexane solution to obtain a 73% yield of 2-hydroxydodecyl dithiocarbamate, melting point 62° C. to 65° C., having the following elemental analysis in percent:

Calcd. for $C_{13}H_{27}NS_2O$: C, 56.26; H, 9.81; N, 5.05; S, 23.11. Found: C, 56.19; H, 9.95; N, 5.10; S, 22.97.

EXAMPLE 4

Preparation of 2-hydroxy-1-methylpropyl dithiocarbamate

A solution of ammonium dithiocarbamate (33.0 grams, 0.30 mole) in absolute methanol (150 ml.) is heated to 69° C. in a suitable 500 ml. three-neck flask equipped with thermometer, dropping funnel, reflux condenser, and magnetic stirrer. Trans-2,3-butylene oxide (21.6 grams, 0.30 mole) is added dropwise with stirring over a 15-minute period. The reaction mixture is refluxed for 1.5 hours and then concentrated in vacuo to leave a residue which is triturated with ether (250 ml.). The ether solution is separated, washed with water, dried over anhydrous magnesium sulfate, and concentrated. This treatment leaves 32.0 grams of an oily solid which is recrystallized from benzene (100 ml.) to yield 20.2 grams of the desired product, melting point 89° C. to 91° C. Several recrystallizations from 1% ethanol in benzene solution gives analytically pure erythro-2-hydroxy - 1 - methylpropyl dithiocarbamate product, whose melting point is 89° C. to 91.5° C. and having an elemental analysis (in percent) as follows:

Calcd. for $C_5H_{11}NOS_2$: C, 36.33; H, 6.71; N, 8.47; S, 38.80. Found: C, 36.19; H, 6.63; N, 8.84; S, 38.45.

Repeating the procedure of Example 4 in every detail except that there is employed cis-2,3-butylene oxide, the threo-2-hydroxy-1-methylpropyl dithiocarbamate isomer is obtained. Similarly, ammonium dithiocarbamate in methanol at reflux temperature is treated with cyclohexene oxide to obtain 2-hydroxycyclohexyl dithiocarbamate in good yield.

In like manner, dimethylammonium dimethyldithiocarbamate in methanol at reflux temperature is treated with cyclohexene oxide to afford 2-hydroxycyclohexyl dimethyldithiocarbamate in good yield.

EXAMPLE 5

Preparation of 2-hydroxypropyl isopropyldithiocarbamate

A solution of isopropylammonium isopropyldithiocarbamate (35.0 grams, 0.18 mole) in methanol (200 ml.) is prepared in a three-neck flask equipped with a thermometer, stirrer, condenser, and dropping funnel. The solution is warmed to 40° C. and a solution of propylene oxide (13.6 grams, 0.23 mole) in an equal volume of methanol is added dropwise with stirring over a 33-minute period. The reaction temperature is maintained at between 40° C. and 45° C. The mixture is stirred for fifteen minutes more, and then concentrated in vacuo to leave a residue which is dissolved in ether. The ether solution is washed with water followed by a saturated aqueous sodium chloride wash solution. It is then dried over anhydrous magnesium sulfate, concentrated in vacuo, and filtered for clarification to obtain 21.3 grams of crude 2-hydroxypropyl isopropyldithiocarbamate, a pale yellow oil.

A 4.8 gram sample of the product is chromatographed on acid alumina (Brockman Activity I) with benzene and 1% methanol in benzene as eluents to yield 3.9 grams of 2-hydroxypropyl isopropyldithiocarbamate, having an index of refraction ($n_D^{25}$) equal to 1.5722, whose elemental analysis in percent is:

Calcd. for $C_7H_{15}NS_2O$: C, 43.49; H, 7.82; N, 7.24; S, 33.17. Found: C, 43.46; H, 7.99; N, 7.29; S, 33.27.

Repeating the above in every detail except that a solution of hexadecylammonium hexadecyldithiocarbamate in methanol is treated with a 20% molar excess of propylene oxide, there is obtained 2-hydroxypropyl hexadecyldithiocarbamate in good yield. Similarly, when a solution of ammonium dithiocarabanilate in methanol is treated with a 20% molar excess of propylene oxide, 2-hydroxypropyl dithiocarbanilate (i.e., 2-hydroxypropyl phenyldithiocarbamate) is obtained.

The procedure of Example 5 is repeated except that a solution of ammonium 2-phenylethyldiocarbamate in methanol is treated with a 20% molar excess of propylene oxide to obtain 2-hydroxypropyl 2-phenylethyldithiocarbamate.

EXAMPLE 6

Preparation of 2-Hydroxypropyl dimethyldithiocarbamate

Dimethylammonium dimethyldithiocarbamate (33.3 grams, 0.20 mole) dissolved in 250 ml. of absolute methanol is placed in a 500 ml. three-neck flask fitted with a stirrer, dropping funnel, condenser, and thermometer. The solution is warmed to 37° C. and propylene oxide (15.1 grams, 0.26 mole) is added dropwise without further external warming at a rate which gives a maximum temperature of 45° C. After addition, the solution is allowed to stand at 25° C. for 1 hour and is then concentrated in vacuo to give a residual oil weighing 38.7 grams, which is dissolved in ether (175 ml.). The ether solution is washed with water, dried and concentrated. There then remains a 97.5% yield of 2-hydroxypropyl dimethyldithiocarbamate.

Fractionation affords analytically pure product, whose boiling point is 120° C. to 122° C. at 0.04 to 0.05 mm. Hg. and having a refractive index ($n_D^{25}$) equal to 1.5939 to 1.5942. Its elemental analysis in percent is:

Calcd. for $C_6H_{13}NS_2O$: C, 40.19; H, 7.31; N, 7.81; S, 35.77. Found: C, 40.21; H, 7.36; N. 7.89; S, 35.84.

EXAMPLE 7

Preparation of 2-hydroxydodecyl dimethyldithiocarbamate

Dimethylammonium dimethyldithiocarbamate (25.0 grams, 0.15 mole) dissolved in 150 ml. of methanol is placed in a 500 ml. three-neck flask equipped with stirrer, dropping funnel, condenser, and thermometer. The solution is heated to 41° C. and 1-dodecene oxide (27.6 grams, 0.15 mole) is added dropwise, the temperature of the reaction solution being maintained at 40° C. to 45° C. After the addition has been completed, the solution is stirred at 25° C. for one hour and at 50° C. to 60° C. for 1.5 hours. Concentration of the reaction solution in vacuo leaves a yellow solid residue, which is recrystallized from benzene-cyclohexane solution to yield 29.6 grams of 2-hydroxydodecyl dimethyldithiocarbamate, whose melting point is 58° C. to 59.5° C. Recrystallization of the product from cyclohexane and from benzene-cyclohexane solution results in a product whose melting point is from 59° C. to 60.5° C. and has an elemental analysis in percent as follows:

Calcd. for $C_{15}H_{31}NS_2O$: C, 58.95; H, 10.22; N, 4.58; S, 20.98. Found: C, 59.40; H, 10.03; N, 4.61; S, 21.16.

EXAMPLE 8

The nematocidal activity of the compounds of the invention is illustrated by the following tests wherein representative compounds (i.e., the compounds of Examples 3 and 5) prepared by the process of the invention, are separately dissolved or suspended in water at a concentration of 0.1%. Approximately 4 milliliters of each test solution are added to separate vials and four drops of a suspension of vinegar eelworms (*Turbatrix aceti*) are mixed therewith. The vials are then placed on a tumbling machine for twenty-four hours to assure exposure of the nematodes to the test compounds. On termination of the exposure period, the vial contents are examined and percent vinegar ellworm mortality determined.

Utilizing the test compounds, 2-hydroxydodecyl dithiocarbamate and 2-hydroxypropyl isopropyldithiocarbamate, 100% nematode kill at 0.1% concentration is effected.

EXAMPLE 9

Herbicidal activity of compounds prepared by the process of the invention is demonstrated by the following test wherein 500 p.p.m. of each of the compounds of Examples 2, 5 and 7 (i.e., 2-hydroxypropyl dithiocarbamate, 2-hydroxypropyl isopropyldithiocarbamate and 2-hydroxydodecyl dimethyldithiocarbamate, respectively) is separately mixed with a 1.5% water agar. The agar, containing the test compound, is then poured into small bottles and permitted to gel. Seeds of wheat, corn, radish, and cucumber, representing monocots and dicots, are placed on the surface of the solidified agar, one plant species per bottle. Two milliliters of water are added to each bottle to help provide optimum conditions for germination. The seeded bottles are covered with glass plates for forty-eight hours after initiation of the test to minimize escape of volatile chemicals and, thereafter, with brown paper to further facilitate germination. The plants are periodically examined following treatment and watered when required. Finally, they are examined three weeks after treatment.

Utilizing the compound of Example 2, 2-hydroxypropyl dithiocarbamate, 70% to 100% control of all plant species is achieved. From about 70% to 100% control of monocots and about 70% control of dicots is observed with the compound of Example 5, 2-hydroxypropyl isopropyldithiocarbamate, and 100% control of monocots is effected with the compound of Example 7, 2-hydroxydodecyl dimethyldithiocarbamate.

What is claimed is:

1. A process for the preparation of a 2-hydroxyalkyl dithiocarbamate selected from the group consisting of:

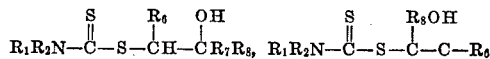

and mixtures thereof comprising: reacting in an inert alcoholic solvent medium at a temperature between about 30° C. and about 75° C. in substantially equimolar proportions a dithiocarbamate salt of the formula:

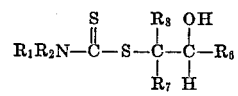

with an epoxide of the formula:

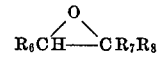

wherein $R_1$, $R_2$, $R_5$, $R_6$, $R_7$ and $R_8$ are each hydrogen, alkyl, phenyl, naphthyl, cyclohexyl, or phenylethyl; $R_3$ and $R_4$ are each hydrogen, alkyl, cyclohexyl or phenylethyl, and thereafter recovering a 2-hydroxyalkyl dithiocarbamate.

2. A method according to claim 1 wherein the reaction is conducted in absolute methanol.

3. A method according to claim 1 wherein the dithiocarbamate salt is ammonium dithiocarbamate.

4. A method according to claim 1 wherein the dithiocarbamate salt is isopropylammonium isopropyldithiocarbamate.

5. A method according to claim 1 wherein the dithiocarbamate salt is dimethylammonium dimethyldithiocarbamate.

6. A method according to claim 1 wherein the epoxide is ethylene oxide.

7. A method according to claim 1 wherein the epoxide is propylene oxide.

8. A method according to claim 1 wherein the epoxide is 1-dodecene oxide.

9. A method according to claim 1 wherein the epoxide is trans-2,3-butylene oxide.

References Cited

Weisberger: "Heterocyclic Compounds," part I, page 345 (1964).

CHARLES B. PARKER, *Primary Examiner.*

D. R. PHILLIPS, *Assistant Examiner.*

UNITED STATES PATENT OFFICE
CERTIFICATE OF CORRECTION

Patent No. 3,407,222                                                    October 22, 19

Thomas Andrew Lies

It is certified that error appears in the above identified patent and that said Letters Patent are hereby corrected as shown below:

Column 6, line 45, beginning with "1. A process" cancel all to and including "dithiocarbamate." in lines 68 and 69, same column 6, and insert:

1. A process for the preparation of a 2-hydroxyalkyl dithiocarbamate selected from the group consisting of:

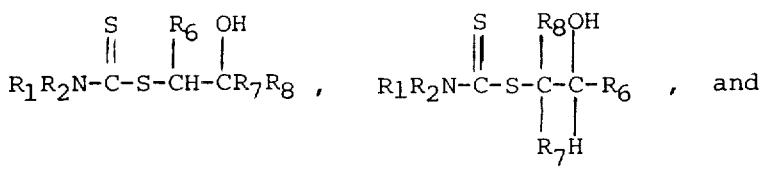

mixtures thereof comprising: reacting in an inert alcoholic solvent medium at a temperature between about 30° C. and about 75° C. in substantially equimolar proportions a dithiocarbamate salt of the formula:

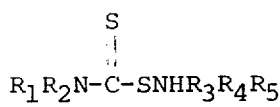

with an epoxide of the formula:

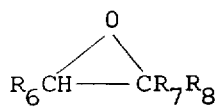

wherein $R_1$, $R_2$, $R_5$, $R_6$, $R_7$ and $R_8$ are each hydrogen, alkyl, phenyl, naphthyl, cyclohexyl, or phenylethyl; $R_3$ and $R_4$ are each hydrogen, alkyl, cyclohexyl or phenylethyl, and thereafter recovering a 2-hydroxyalkyl dithiocarbamate.

Signed and sealed this 10th day of March 1970.

(SEAL)
Attest:

EDWARD M. FLETCHER, JR.                                      WILLIAM E. SCHUYLER,
Attesting Officer                                                        Commissioner of Paten